(12) United States Patent
Horton

(10) Patent No.: US 6,279,799 B1
(45) Date of Patent: Aug. 28, 2001

(54) PORTABLE DETACHABLE COMBINATION GUN CASE AND GUN RACK FOR A VEHICLE

(76) Inventor: Richard Lane Horton, 6804 Creek Ridge Rd., Wilmington, NC (US) 28411

( * ) Notice: Subject to any disclaimer, the term of this patent is extended or adjusted under 35 U.S.C. 154(b) by 0 days.

(21) Appl. No.: 09/607,384

(22) Filed: Jun. 30, 2000

(51) Int. Cl.[7] .................. B60R 7/14; B60R 7/00
(52) U.S. Cl. .......... 224/275; 224/572; 224/913; 211/64
(58) Field of Search .................. 224/275, 572, 224/913, 604, 605, 581, 582, 583, 547; 211/64

(56) References Cited

U.S. PATENT DOCUMENTS

| | | | |
|---|---|---|---|
| D. 365,717 | 1/1996 | Cardenas | D6/552 |
| 2,535,564 | 12/1950 | Campbell | 224/42.42 |
| 2,574,730 | 11/1951 | Crew et al. | 224/2 |
| 2,797,033 | 6/1957 | Rasbach | 224/1 |
| 3,081,923 * | 3/1963 | Bagby . | |
| 3,167,182 | 1/1965 | Calvin | 211/64 |
| 3,295,887 * | 1/1967 | Bacon . | |
| 3,326,385 | 6/1967 | Pinkerton et al. | 211/4 |
| 3,857,491 | 12/1974 | Townsend et al. | 211/8 |
| 3,987,946 * | 10/1976 | Haglof . | |
| 4,024,997 | 5/1977 | Kolpin | 224/2 R |
| 4,249,687 | 2/1981 | Warnier | 224/913 |
| 4,369,904 * | 1/1983 | Christensen . | |
| 4,756,456 * | 7/1988 | Schauer . | |
| 4,953,767 * | 9/1990 | Bennett . | |
| 4,995,537 | 2/1991 | Thedieck | 224/273 |
| 5,495,969 * | 3/1996 | Cardenas | 224/275 |
| 5,540,364 * | 7/1996 | Krieger et al. . | |
| 5,833,102 | 11/1998 | Jacobson | 224/275 |
| 5,865,502 * | 2/1999 | Ayers et al. . | |
| 5,868,294 * | 2/1999 | Webster | 224/275 |
| 6,092,705 * | 7/2000 | Meritt | 224/275 |

* cited by examiner

Primary Examiner—Gregory M. Vidovich
(74) Attorney, Agent, or Firm—Michael E. Mauney

(57) ABSTRACT

An adjustable gun rack for a vehicle. Adjustable straps with buckles are used to be secured to a rigid structure within a vehicle. On the adjustment straps are hooks for mounting a detachable gun case. Usually, several hooks will be provided and several gun cases will be provided so that more than one long barrel firearm may be placed within each gun case and mounted on the adjustable straps. The straps will mount around upright seat backs with the gun cases hanging from the hooks on the straps. The straps could go around a seat bottom with the gun case hanging between the edge of the seat and the floorboard of the vehicle. The straps are flexible and adjustable so they can be configured to fit a variety of configurations in different vehicles. The individual gun case may be detached from the adjustable straps and used with a shoulder strap to transport a long barrel firearm inside the gun case away from the vehicle where the adjustable gun rack is mounted.

13 Claims, 5 Drawing Sheets

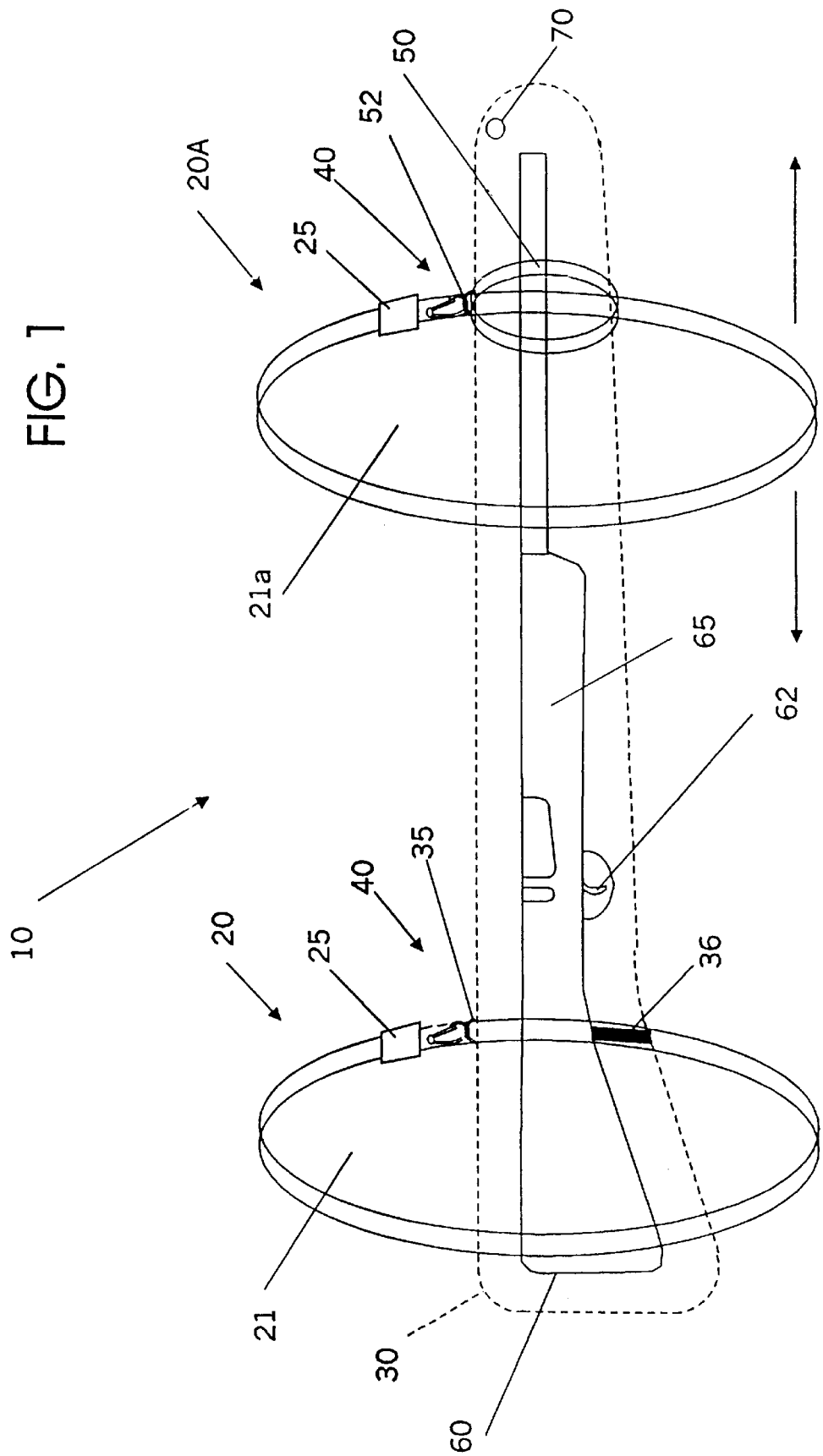

PORTABLE DETACHABLE COMBINATION GUN CASE AND GUN RACK FOR A VEHICLE

BACKGROUND OF THE INVENTION

1. Field of the Invention

This invention relates to a way of safely carrying firearms inside a vehicle. This invention uses straps, connector devices, and at least one soft case for a long barrel firearm so that at least one long barrel firearm may be carried within a vehicle, that the firearms are readily accessible, and the firearms may be removed from the vehicle either inside the soft case or removed from the soft case for use.

2. Description of Related Art

In rural areas, gun racks are commonly seen in the back of vehicles, especially pick-up trucks or other vehicles which can be used off the road in hunting applications. Perhaps the most commonly seen gun rack is simply a standard wooden gun rack where there are two rigid parallel support pieces having a plurality of curved support hooks placed in alignment on the two vertical support pieces. A shotgun, rifle, or similar firearm is simply slipped over the upper end of the hook where its rests in the bottom portion of the hook and is supported there by gravity. Sometimes the hooks may be lined with a soft material like felt or rubber both to further secure the firearm in place and to cushion the firearm from scratches or other damage that might be caused as the truck is bounced by road bumps and hazards while the truck is in motion.

This standard gun rack has a variety of drawbacks. First, it is usually affixed to the truck so that it cannot easily be removed if desired. Second, it exposes the guns to view from the outside, making them a tempting target for a casual thief. Third, the guns are not as securely mounted in the rack as is desirable. For these and other reasons, a variety of devices have been proposed to remedy these perceived deficiencies in gun racks used in vehicles. For example, Jacobson, U.S. Pat. No. 5,833,102 proposes a one-piece spring-action bracket mounted to the seat of a vehicle by buckles. Cardenas, U.S. Pat. No. 5,495,969 proposes a metal gun rack secured to a seat by straps which allow a rifle to be mounted with a scope affixed to the rifle. This rigid rack folds for storage. Thedieck, U.S. Pat. No. 4,995,537 proposes a strap-like removable gun rack mounted horizontally with loops in the strap to hold the barrel of the gun while the vehicle floor supports the butt of the gun stock. Kolpin, U.S. Pat. No. 4,024,997 takes a different path where a gun case has means for attachment to a coat hanger-like bent wire support, which can then be used to support the gun case and the gun contained therein in a clothes closet or the like. Conceivably, the Kolpin device could be used to support a gun in a vehicle if there was an appropriate support for the open loop of the clothes hanger-like support device used in the Kolpin invention and room for the gun. Townsend et al., U.S. Pat. No. 3,857,491 discloses a vehicle mounted gun rack. This gun rack is permanently mounted. It provides a locking mechanism to secure the gun in place in the rack. Pinkerton et al., U.S. Pat. No. 3,326,385 shows a gun rack with an electric gun lock keyed to the ignition of a vehicle. A variety of other rigid gun racks are employed to secure guns to the back of a support structure, usually the seat or rear wall of the truck. Examples may be seen in Calvin, U.S. Pat. No. 3,167,182; Rasbach, U.S. Pat. No. 2,797,033; and Campbell, U.S. Pat. No. 2,535,564.

Despite this earlier work none of the gun racks disclosed in patents or on the market are entirely satisfactory. Ideally a gun rack should be light, easily removed, and compactly stored when not in use. Secondly, it should require no, or very minor, modifications to a vehicle to be used. Third, it should give the owner options about where and how the rack would be mounted. In some cases, it might be preferable to mount to the back of the seat, in other cases to a front side of a seat for the vehicle, or to some fixed wall or support structure within the vehicle such as the back wall of a pick-up truck or the side wall of an SUV. Next, the rack should provide for safe storage of the gun so that the gun will not be damaged, scratched, bent, or broken in the event the vehicle is traversing over rough or uneven terrain, hits potholes in the road, or take such other maneuvers as may cause the gun to be bounced or bumped around. Next, the gun itself must be safely secured within the rack so as to minimize the risk of accidental discharge of the weapon. The gun should be easily retrieved from the rack when it is desired to be used. Finally, it would be desirable to have portions of the rack easily adoptable for use as a gun case whereby the gun may be easily carried while contained within the gun case, and then simply clipped into the rack when not in use.

SUMMARY OF THE INVENTION

The current invention consists of adjustable straps and detachable gun case. These straps are used to provide the support structure for the gun case for containing the long barrel guns. These straps may be secured in a variety of ways to a rigid structure within a vehicle. For example, the straps could be slipped around and secured in place around a standard foldable bench seat commonly seen in single seat pick-up trucks. In this seat configuration, the bench seat usually folds forward to reveal a small storage area behind the seat. Here the straps would be passed around the seat vertically, tightened, and secured in place by any of a variety of means, including such devices as D-rings, plastic clips, or the miniature hook-and-eye fastening system known by the trade name of Velcro™. Because the straps are flexible, they easily adjust to fit a variety of configurations of bench seats. Disposed along one surface of the straps are clips, D-rings, or such similar connecting device that allow the detachable gun case to be attached to the connecting device on the straps. The gun case is used to secure a long barrel gun into place within the case, then the case itself is attached to the supporting straps by appropriate connecting devices. The individual gun case can be used with a shoulder strap so that the gun case could actually be used as a carrying device for the gun by the gun user when in transit to or from the vehicle or used to carry the gun while hunting, then the gun case can be simply clipped to the support straps for transport within the vehicle. When not in use, the straps could be removed, leaving no trace in the vehicle that the vehicle was ever used to transport guns. Moreover, when the bench seat is folded upright for use, the guns themselves would be secured out of sight reducing the risk of casual theft. Using the supporting strap system provides a variety of mounting options, including mounting along the front side of the seat. This might be used in law enforcement applications where immediate access to a weapon is desirable. Moreover, the straps could be mounted to fixed hooks or ring-like devices mounted on any rigid wall within a truck, including the back wall in a pick-up truck, the side wall of a pick-up truck or SUV, or virtually any other place where there is enough room to safely secure a long barrel firearm. These and other advantages of the current invention will become apparent from the Detailed Description of the Drawings, which follows.

BRIEF DESCRIPTION OF THE DRAWINGS

FIG. 1 shows the current invention.

DETAILED DESCRIPTION OF THE DRAWINGS

Figure 2A:
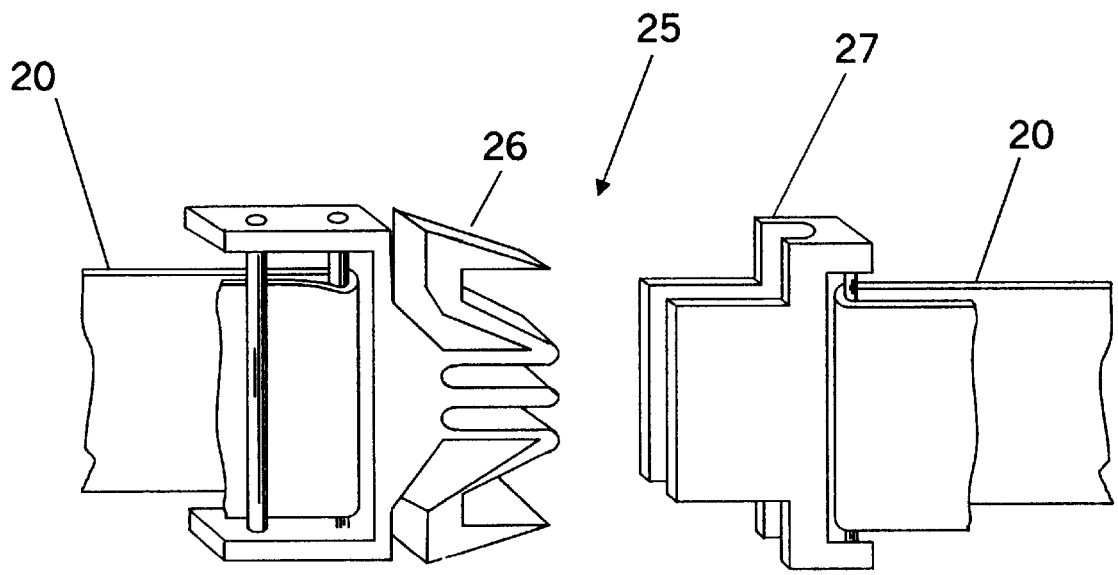
FIG. 2A shows in detail one possible buckle used with the current invention.

FIG. 1 is a stylized depiction of the flexible gun rack (10) invention. Two flexible straps (20) and (20A) are shown spaced apart from each other. Here, the two flexible straps (20) and (20A) are formed into respectively loops (21) and (21A) for each flexible strap (20) and (20A). The two straps (20) and (20A) end in buckle pieces (seen in detail in FIG. 2A) that connect at the buckle (25). The loops (21) and (21A) formed by the flexible straps (20) and (20A) provides a means for securing the flexible gun rack (10) to a rigid structure within a vehicle. For example, the loops (21) and (21A) formed by the flexible straps (20) and (20A) could be secured around the upright back of a bench seat in a vehicle. The buckles (25) which connects the ends of the flexible straps (20) and (20A) are seen in more detail in FIG. 2A. Shown in dotted lines is a gun case (30) secured in place on the two spaced apart flexible straps (20) and (20A). Here, a first D-ring (35) is connected to the gun case (30). The first D-ring (35) snaps into a clip (40) which is secured on the strap (20). The balance point of a long barrel weapon is ordinarily closer to the butt and lock mechanism that to the end of the barrel, because the butt and lock mechanism are relatively heavier than is the barrel structure and handle of the gun. Because the gun case (30) is held into place against the clip (40) by the force of gravity, due primarily to the weight of the gun (60) within the gun case (30), it is ordinarily desirable to place the gun (60) within the gun case (30) so that the balance point (65) of the gun (60) will be between the two straps (20) and (20A). To that end, a portion of the gun case (30) will be sewn together sometimes with a stiffening rib (36) of plastic or other material placed within sewn portion of the gun case (30) and aligned with the D-ring (35). When the gun (60) is placed within the gun case (30), it will be placed in such a position that the trigger guard (62) is ahead of the stiffening rib (36). This secures the gun (60) into position and means a sufficient portion of the weight of the gun (60) will be positioned so as to secure the gun case (30) in place on the second strap (20A). At the barrel end of the gun case (30) is a grommet (70) which along with the D-ring (35) can be used to attach a carrying strap (not shown) to the gun case (30) to facilitate transportation of the gun (60) outside of a vehicle by detaching the gun case (30) from the straps (20) and (20A), attaching a carrying strap (not shown) to the gun case (30), and then carrying the gun case (30) on one's shoulder using the carrying strap (not shown).

Because vehicles come with different configurations and it may be necessary to mount the two straps (20) and (20A) at different points on seats in different vehicles, the distance between the two straps (20) and (20A) may vary from application to application. Therefore, a gun case support strap (50) is connected to a second D-ring (52). The gun case support strap (50) is formed into an appropriate size loop and the barrel end of the gun case (30) is placed through the loop. Because the balance point (65) of the gun (60) is placed between the first D-ring (35) and the second D-ring (52), a sufficient portion of the weight of the gun (60) is placed so as to assure that the gun case (30) hangs in place supported by the strap (50), the D-ring (52), and the clip (40). The strap (20A) mounting portion may be adjusted along the seat as is appropriate as is shown by the arrows. This arrangement of the straps (20) and (20A) and the means that are used to support the gun case (30) and the gun (60) within the gun case (30) allows adjustment to a wide variety of automobile seating configurations for the flexible gun rack (10).

FIG. 2A shows in more detail the buckle (25). Flexible straps or belts are used in a variety of applications to secure or support objects. Among other common applications are belts worn by men around their trousers, seat belts used in cars, carrying straps and belts used on luggage and the like. For each of these applications, it is common to allow for adjustment of the overall length of the belt connected by a buckle. There are a variety of technologies employed to achieve this purpose. Shown here is a common type of plastic buckle (25) sometimes called an Akita clip. As shown in FIG. 2A, the male member (26) and female receptor (27) are not connected, but could be connected by forcing the male member (26) and female receptor (27) together to form the connected buckle (25). As can be seen, there is a length of the flexible strap (20) connected at one end to the male member (26) and at the other end to the female receptor (27). The flexible strap (20) is made longer than is needed to allow adjustment. The flexible strap (20) may be adjusted by pulling one end where it is attached, usually by a frictional fit, to the male member (26) and the female receptor (27). Various types of snaps or other devices can be used to secure the flexible strap (20) from slipping within the buckle (25). This allows the overall length of the flexible straps (20) and (20A) to be adjusted hence, allowing the diameter of the securing loops (21) and (21A) to be adjusted as necessary. The particular type of buckle (25) employed, as well as the particular material for the flexible straps (20) and (20A) is a matter of convenience, rather than necessity. There are a number of types of technology for buckles (25) which will work equally well as the type illustrated in FIG. 2A. By the same token, a variety of materials can be employed for construction of the flexible straps (20) and (20A). Most commonly it would be constructed of a durable woven material like nylon similar to the types of material that are employed in seat belts or other connecting straps. However, the straps (20) and (20A) could be made of rubber, some combination of woven and stretchable material, or any other convenient durable flexible material.

Figure 2B:
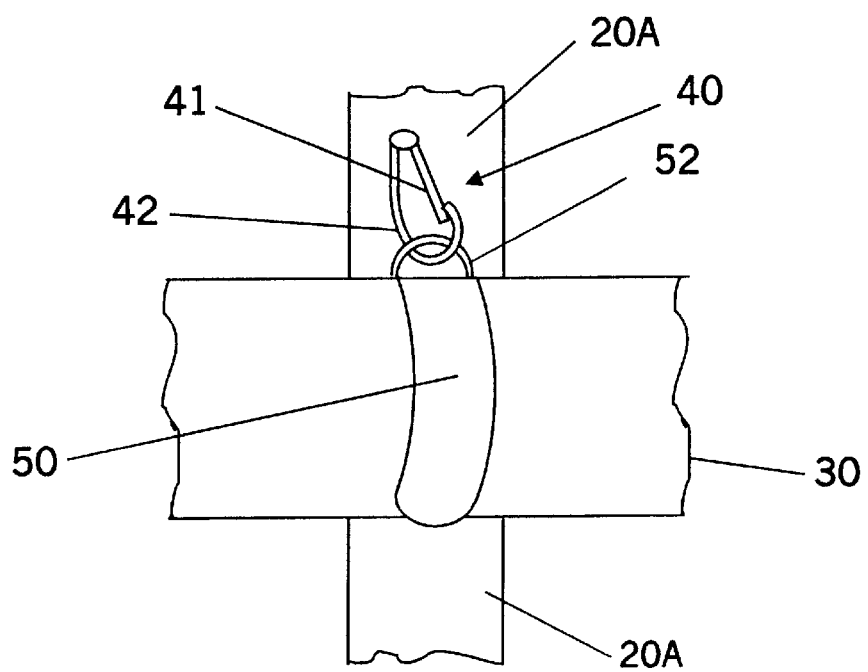
FIG. 2B shows in detail a first place of connection of a gun case in the current invention.

FIG. 2B shows in more detail the connections of the gun case (30) to the flexible strap (20A). A variety of technologies can be employed to make this connection. Here, a clip (40) is shown. This is a standard clip (40) with a fish hook shaped piece (42). A D-ring (52) slips over the hook (42) and hangs into place secured ordinarily by gravity and by tension. A flexible tongue (41) fits against the underside of the hook (42) and flexes easily inwardly to allow easy mounting of the D-ring (52), but is held into place by the underside of the hook (42) to secure the D-ring (52) into place unless the flexible tongue (41) is acted on by a downward outside force. A belt (50) fits around the gun case (30) and loops back to the D-ring (52) which is connected to the clip (40). The belt (50) passes through the D-ring (36) and adjustably fits to the gun case (30). As with the buckle (25), a variety of technologies are available for attachment of the gun case (30) to the flexible straps (20) and (20A).

Again, male and female connecting buckles, like those shown in the buckle (25) in FIG. 2A, could be used instead of the clip (40) and D-ring (52) that is illustrated. Because the need to secure an item in place is commonly encountered, a variety of technologies have been devised to achieve this objective and any of those could be employed here. Any convenient way of securing the gun case (30) to the flexible straps (20) and (20A) that will allow secure attachment to the straps (20) and (20A) while simultaneously allowing the gun case (30) to be readily disconnected from its points of attachment to the flexible straps (20) and (20A) will serve as well as those illustrated in FIG. 2B.

Figure 2C:
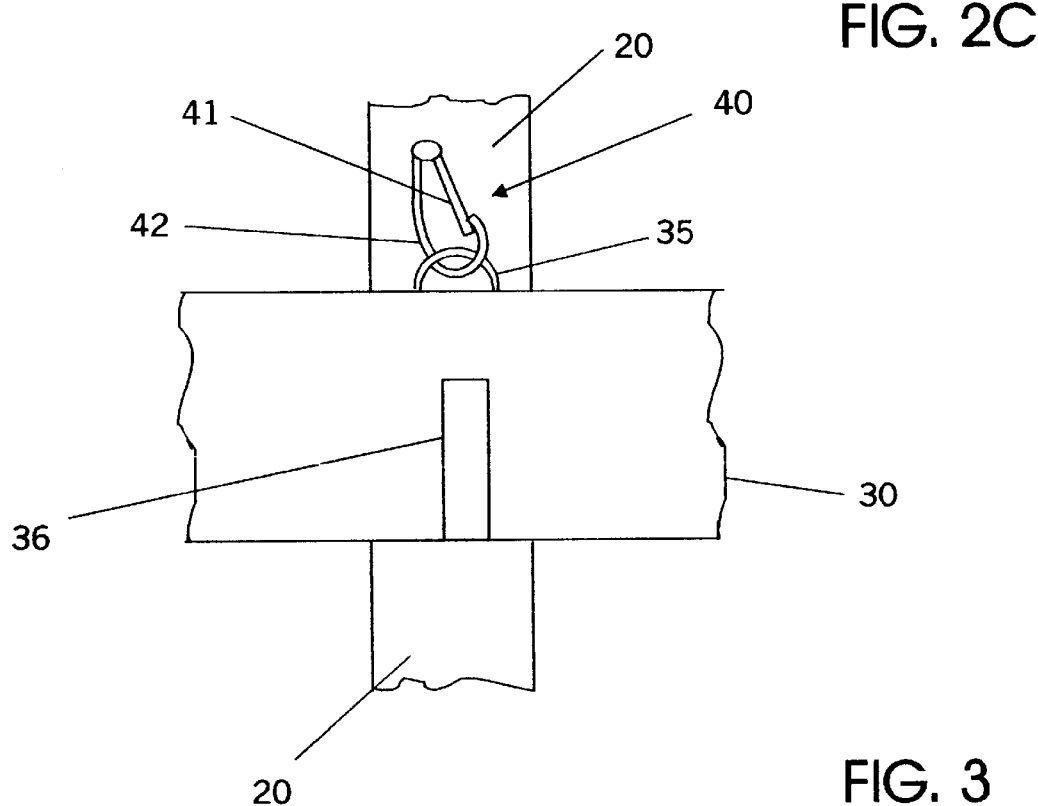
FIG. 2C shows in detail a second place of connection of a gun case in the current invention.

FIG. 2C shows the point of connection of the gun case (30) to the flexible strap (20). Here a clip (40) is attached to the flexible strap (20). The D-ring (35) is affixed to the gun case (30). The D-ring (35) passes through the clip (40) and hangs there by gravity. The D-ring (35) will ordinarily be placed at the top of the gun case (30). Shown at the bottom of the gun case (30) is a stiffening rib (36). The front and back of the gun case (30) are sewn together at the point of the placement of the stiffening rib (36). A gun (60) (not shown)slipped within the gun case (30) will be placed so that the trigger guard (62) of the gun (60) (not shown) will be placed ahead of the stiffening rib (36) with the remainder of the handle and butt of the gun extending from the stiffening rib (36) toward the opening at one end of the gun case (30). The function of the stiffening rib (36) is to be sure that the gun (60) is placed within the gun case (30) in an appropriate relationship between the two straps (20) and (20A).

Figure 3:
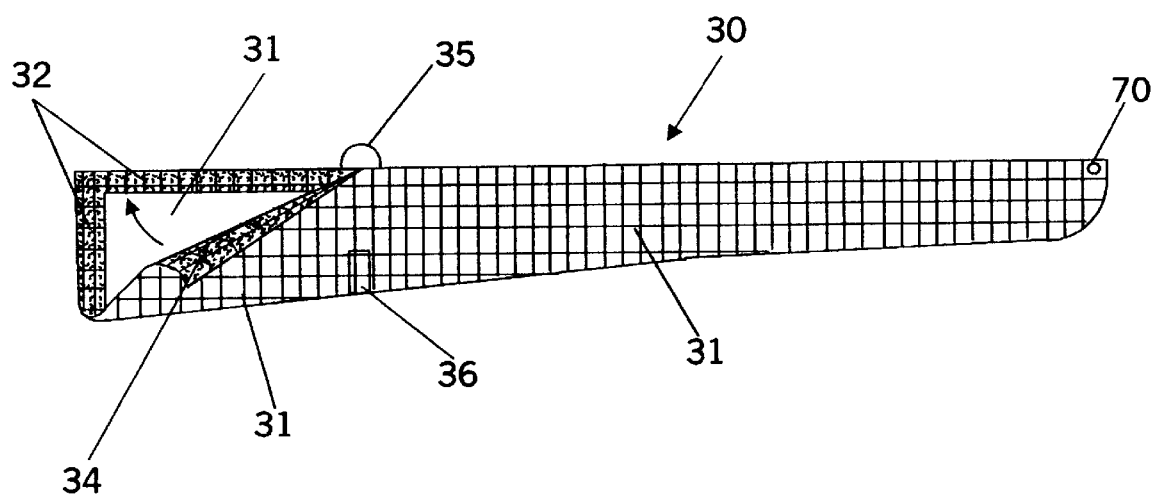
FIG. 3 shows the gun case of the current invention.

FIG. 3 shows in more detail the gun case (30). The gun case (30) is ordinarily constructed of a mesh-like material (31). A purpose of using a mesh-like material (31) is to allow air to freely circulate through the walls of the gun case. Thus, if a gun (60) (not shown) is placed inside the gun case (30) when it is wet, the circulation of air through the gun case (30) will dry the gun (60) (not shown). Moreover, a mesh-like material construction for the gun case (30) will allow the gun to be visualized inside the case. Thus, the user of the flexible gun rack (10) will know at a glance if a gun (60) is mounted inside the gun case (30). The D-ring (35) and the grommet (70) can be used to connect the gun case (30) to a carrying strap (not shown) which would go over the shoulder of a person who was carrying the gun case (30), especially when a gun (60) (not shown) is secured inside the gun case (30). The gun case (30) is ordinarily simply constructed by taking the mesh-like material (31), folding it into a pocket and attaching it along a seam to form a case. However, at one end of the gun case (30) the mesh-like material (31) is not permanently attached along a seam, but rather uses miniature hook-and-eye material known by the trade name of Velcro™ to provide a way of opening one end of the gun case (30) to provide an opening for placement of a gun (60) (not shown) inside the gun case (30) and for removal of the gun (60) (not shown) from the gun case (30). Here, the flexible hook-and-eye material is simply a strip of hook material (32) and eye material (34) attached along opposing surfaces of the mesh-like material (31) so that a flap is formed. The flap is folded inwardly as shown by the arrow to matedly seal the eye material (34) to the hook material (32) thus, closing the opening created at one end of the gun case (30). As described here, the flap on the gun case (30) is connected to close the gun case by a miniature hook-and-eye material (32) (34), but a zipper or other convenient means of attaching the two surfaces of the gun case (30) would work as well. Although it is believed that the gun case (30) is preferably constructed of a mesh-like material (31), in some applications a different material could be employed. For example, many gun cases are constructed of a leather-like material lined with fleece. The actual manner and materials of which the gun case are constructed may be varied without departing from the essential requirements of the flexible gun rack (10) invention.

Figure 4A:
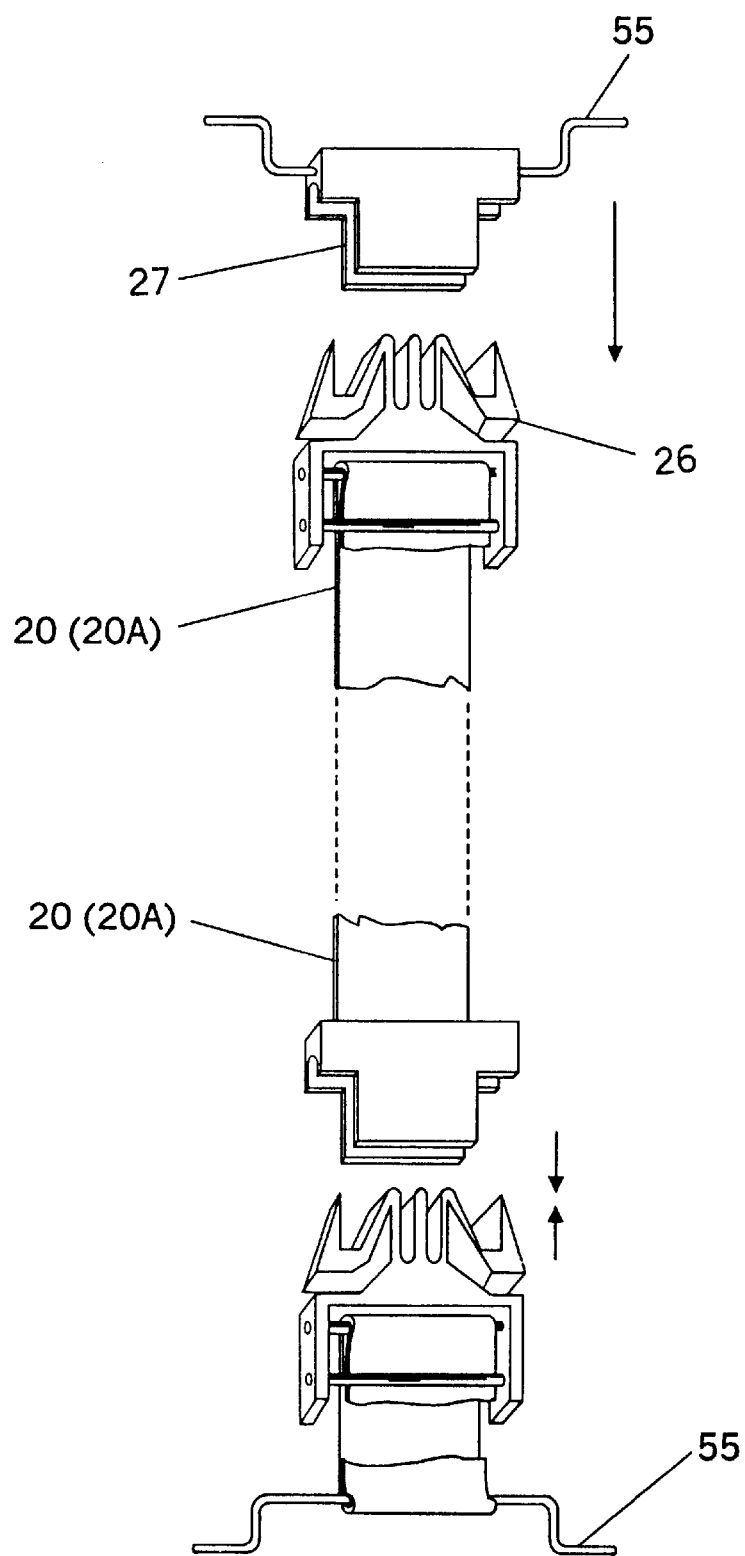
FIGS. 4A, 4B, and 4C show variations of ways of attaching the current invention to some part of a vehicle.

FIG. 4A shows one possible way of securing the flexible straps (20) and (20A) to points on a rigid structure within a vehicle. Here, four rigid metal U- shaped supports (55) are removably attached to a rigid structure within the vehicle like a sidewall by bolts, screws, or other convenient means. For each U-shaped support (55), respectively a male member (26) and a female receptor (27) are attached to the U-shaped support pieces (55), then respectively for flexible straps (20) and (20A) the appropriate female receptor (27) is aligned with a male member (26) attached to the U-shaped support (55) or a male member (26) on respectively straps (20) and (20A) are aligned with the female receptor (27) on the U-shaped support structure (55).

Thus, no loops (21) are formed in this method of connecting the flexible straps (20) and (20A) to a rigid wall structure inside a vehicle. Rather, each end of the flexible straps (20) and (20A) are connected by buckles to a U-shaped support (55). The flexible straps (20) and (20A) will be tightened into place and the remaining connections of the gun case (30) to the flexible straps (20) and (20A) will take place as shown in FIG. 1 and FIGS. 2B and 2C.

While it is believed the connections shown in FIG. 4A are a preferable way of attaching the flexible straps (20) and (20A) to a rigid wall inside a vehicle, it can be readily appreciated by one of skill in the art that a variety of other ways are also feasible. For example, the flexible straps (20) and (20A) could simply be looped around the U-shaped connectors (55) and the female connector (26) and the male connector (27) mounted at the end of the straps (20) and (20A) could be mated to each other as is shown in FIG. 1A. Indeed, one could simply hang the flexible straps (20) and (20A) from respectively a single U-shaped connector (55) for each flexible strap (20) and (20A) allowing it to hang in place by gravity. A drawback to this arrangement is that there would be no tension on the flexible straps (20) and (20A) other than provided by gravity. However, when the straps are positioned on two spaced apart U-shaped connectors, the straps (20) and (20A) may be tensioned into place more securely fixing them along the rigid wall on which the U-shaped connectors (55) are mounted.

Figure 4B:
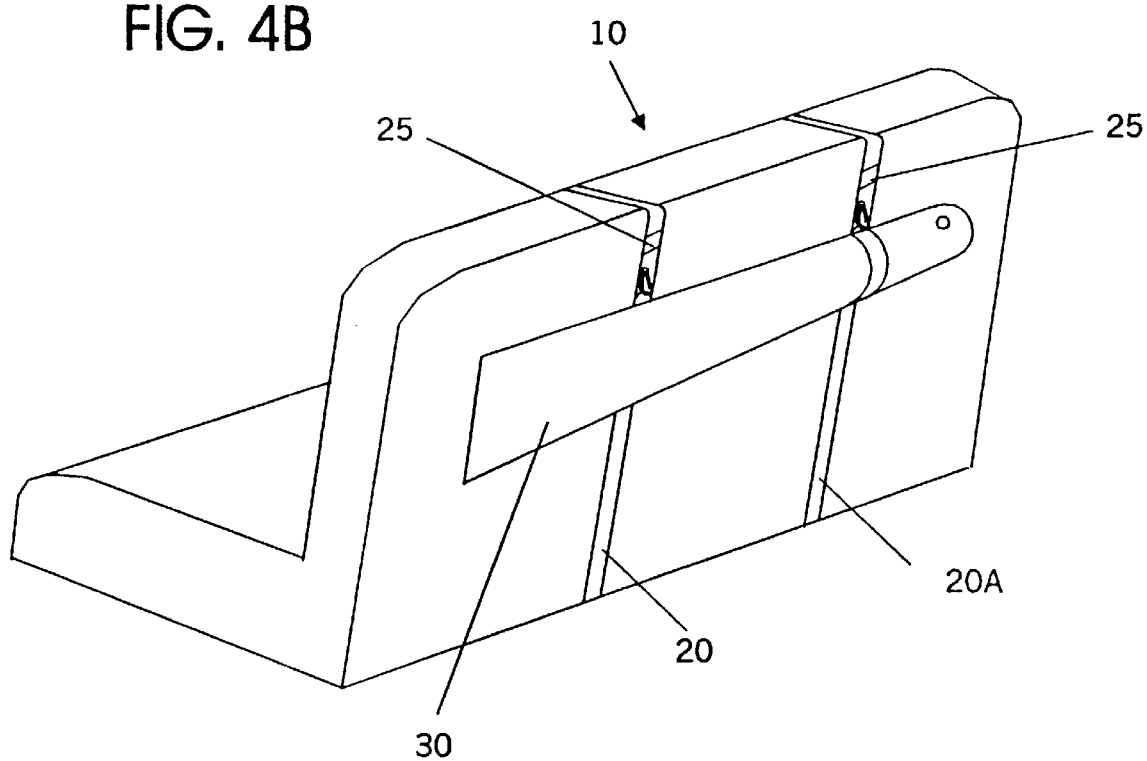
Figure 4C:
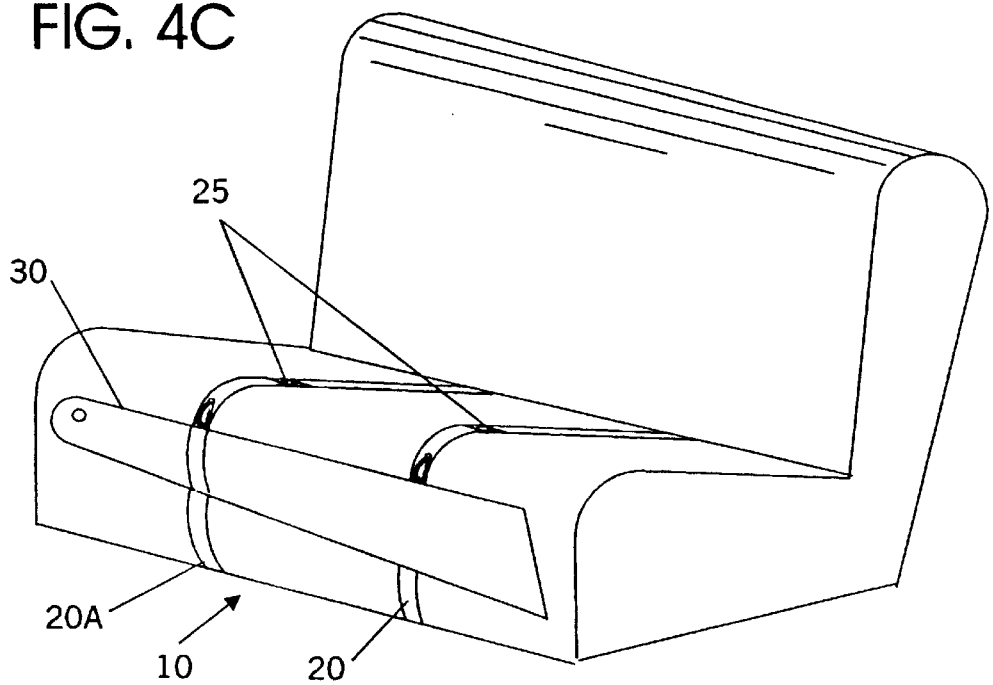

FIG. 4B shows the flexible gun rack (10) secured to the back of a bench seat with the gun case (30) attached appropriately to flexible straps (20) and (20A) with a gun (60) (not shown) secured within the gun case (30). Alternatively, FIG. 4C shows flexible gun rack (10) secured around the seat portion of an automobile seat with the gun case (30) and a gun (60) secured therein positioned between the front edge of the seat and the floorboard of a vehicle. This arrangement would allow the user of the vehicle, if necessary, to have access to the gun (60) while remaining within the vehicle and without manipulating the seat back. This method of attachment of the gun case to a seat could be used in circumstances where, for whatever reason, the seat back is not an appropriate point of attachment for the flexible straps (20) and (20A).

The variety of means of attaching the flexible gun rack (10) to positions within a vehicle provide a great deal of flexibility so that it can be used with almost any vehicle. The flexible gun rack (10) is inexpensively constructed of widely available materials, is easily attached and removed from a vehicle, provides a gun case that can not only carry the gun within the vehicle but can be used with a shoulder strap to carry the gun outside the vehicle, and provides a safe, convenient, and secure way of transporting long barrel weapons within a vehicle. It will be appreciated by one of skill in the art that variations in the construction and materials as described in the Detailed Description of the Drawings can be done without departing from the spirit of this invention and that the above description is not a limitation on the scope of the protection provided by this patent but only by the claims which follow.

I claim:

1. A portable detachable gun rack for a vehicle comprising:
   (a) a first flexible strap;
   (b) a first means for connection on said first strap;
   (c) a second means for connection on said first strap, said first means for connection spaced apart from said second means for connection;
   (d) a first means for adjusting a length of said first strap between said first means for connection and said second means of connection;
   (e) at least one gun case enclosure openable at one end and sized to hold a firearm;
   (f) on said first strap at least one third means for releasably connecting said gun case enclosure to said strap;
   (g) a means for attaching said first strap to a vehicle;
   whereby said flexible first strap is attached to a vehicle, the length of said first strap is adjusted to tension said first strap, said gun case enclosure is connected to said first strap so that a gun may be placed inside of said gun case enclosure for transportation inside of a vehicle, wherein there is at least a second flexible strap; a fourth means for connection on said second strap and a fifth means for connection on said second strap spaced apart from said fourth means; a second means for adjusting a length of said second strap between said fourth means for connection and said fifth means for connection; on said second strap at least one sixth means for connecting said gun case enclosure to said second strap; and a second means for attaching said second strap to the vehicle.

2. A portable detachable gun rack for a vehicle of claim 1 wherein said means for attaching said first strap to a vehicle and said means for attaching said second strap to a vehicle further comprises connecting said first means for connection on said first strap to said second means for connection on said first strap forming a first loop, said first loop positioned around a rigid structure in said vehicle, and said fourth means for connection on said second strap is connected to said fifth means for connection on second strap forming a second loop, said second loop positioned around a rigid structure in said vehicle, said length of said first strap between said first means for connection and said second means for connection adjusted by said first means for adjusting a length of said first strap so that said length of said first strap is tensioned around said rigid structure, said length of said second strap between said fourth means for connection and said fifth for connection adjusted by said second means for adjusting a length of said second strap whereby said length of said second strap is tensioned around said rigid structure and said gun case enclosure is attached to said first strap by said third means for connection and said gun case enclosure is attached to said second strap by said sixth means for connecting said gun case to said second strap.

3. A portable detachable gun rack for a vehicle of claim 2 whereby a distance between said first strap and said second strap is variable according to the needs of a user.

4. A portable detachable gun rack for a vehicle of claim 3 wherein said gun case enclosure has means for connecting said gun case enclosure to a shoulder strap whereby said gun case enclosure may be carried by a user on a user's shoulder.

5. A portable detachable gun rack for a vehicle of claim 1 wherein said means for attaching said first strap to a vehicle and said means for attaching said second strap to a vehicle comprises connecting said first means for connection on said first strap, said second means for connection on said first strap, said fourth means for connection on said second strap, and said fifth means for connection on said second strap to spaced apart points of connection on said vehicle, said length of said first strap between said first means for connection and said second means for connection is adjusted by said means for adjustment so that said first strap is tensioned between the point of connection for said first means and the point of connection for said second means and the length of said second strap is adjusted by said means for adjusting a length of said second strap so that said second strap is tensioned between the point of connection of said fourth means of connection and the point of connection of said fifth means of connection and said gun case enclosure is attached to said first strap by said third means of connection and to said second strap said sixth means for connection.

6. A portable detachable gun rack for a vehicle of claim 5 whereby distance between said first strap and said second strap is variable according to the needs of a user.

7. A portable detachable gun rack for a vehicle of claim 6 wherein said gun case enclosure has means for connecting said gun case enclosure to a shoulder strap whereby said gun case enclosure may be carried by a user on a user's shoulder.

8. A portable detachable gun rack for a vehicle of claim 4 wherein said gun case enclosure has a stiffening rib in said gun case enclosure proximal to said third means for connecting.

9. A portable detachable gun rack for a vehicle of claim 7 wherein said gun case enclosure has a stiffening rib in said gun case enclosure proximal to said third means for connecting.

10. A portable detachable gun rack for a vehicle comprising;
   (a) a first flexible strap;
   (b) a male buckle member slidably attached to said first strap;
   (c) a female buckle member, mateably connectable to said male buckle member, said female buckle member slidably attached to said first strap at a point on said first strap spaced apart from said male buckle member;
   (d) at least one clip at a fixed point on said first strap;
   (e) at least one gun case enclosure with a ring attached to said gun case enclosure, said ring sized to fit within said clip whereby said gun case enclosure may be attached to said first flexible strap.
   (f) a second flexible strap with a male buckle member slidably attachable to said second strap, a female buckle member mateably connectable to said male buckle member, said female buckle member slidably attached to said second strap at a point on said second strap spaced apart from said male buckle member on said second strap, at least one clip at a fixed point on said second strap, and a means for attaching said gun case to said clip on said second strap.

11. A portable detachable gun rack for a vehicle of claim 10 wherein said means for attaching said gun case to said clip on said second loop is a loop strap with a ring on said loop strap, said ring sized to fit within said hook clip on said second strap and said loop strap sized to fit around said gun case enclosure.

12. A portable detachable gun rack for a vehicle of claim 11 wherein said gun case enclosure has a stiffening rib in said gun case enclosure proximal to said ring on said gun case enclosure which connects to said clip on said first strap.

13. A portable detachable gun rack for a vehicle of claim 12 wherein said gun case enclosure has a grommet whereby said gun case enclosure may be carried on a user's shoulder by a shoulder strap.

\* \* \* \* \*